(12) United States Patent
Xu et al.

(10) Patent No.: US 12,395,892 B2
(45) Date of Patent: Aug. 19, 2025

(54) RESOURCE POOL CONFIGURATION AND USAGE FOR V2X (71) Applicant: Nokia Technologies Oy, Espoo (FI)

(72) Inventors: Xiang Xu, Jiangsu (CN); Vinh Van Phan, Oulu (FI); Ling Yu, Kauniainen (FI); Jedrzej Stanczak, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 642 days.

(21) Appl. No.: 17/634,599

(22) PCT Filed: Aug. 14, 2019

(86) PCT No.: PCT/CN2019/100660
§ 371 (c)(1),
(2) Date: Feb. 11, 2022

(87) PCT Pub. No.: WO2021/026840
PCT Pub. Date: Feb. 18, 2021

(65) Prior Publication Data
US 2022/0345942 A1 Oct. 27, 2022

(51) Int. Cl.
H04W 28/16 (2009.01)
H04W 4/40 (2018.01)
H04W 72/53 (2023.01)

(52) U.S. Cl.
CPC ............. *H04W 28/16* (2013.01); *H04W 4/40* (2018.02); *H04W 72/53* (2023.01)

(58) Field of Classification Search
CPC ....... H04W 28/16; H04W 4/40; H04W 72/53; H04W 72/02; H04W 72/51; H04W 72/52; H04W 72/535; H04W 72/23; H04W 92/18
See application file for complete search history.

(56) References Cited

U.S. PATENT DOCUMENTS

2017/0086081 A1  3/2017  Kim et al. ............................ 24/2
2018/0124771 A1  5/2018  Mok et al. ........................ 72/48
(Continued)

FOREIGN PATENT DOCUMENTS

CN  105934996 A  9/2016
CN  107360533 A  11/2017
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN), Overall description; Stage 2 (Release 15)", 3GPP TS 36.300, V15.5.0, Mar. 2019, pp. 1-363.
(Continued)

*Primary Examiner* — Yemane Mesfin
*Assistant Examiner* — Salma Ayad
(74) *Attorney, Agent, or Firm* — Barta Jones, PLLC (57) ABSTRACT Embodiments of the present disclosure relate to devices, methods, apparatuses and computer readable storage media of resource pool configuration and usage for V2X. The method comprises receiving, at a first device, information of a set of resource pools allocated for a predetermined area from a second device and a usage pattern for the set of resource pools from a third device, the usage pattern at least indicating an association between the set of resource pools and at least one property of the predetermined area. The method further comprises determining at least one attribute of the first device related to the at least one property and determining a target resource pool for communication from the set of resource pools based on the at least one attribute, the information and the usage pattern. In the solution, the V2X control device may coordinate the resource pool configuration with the network device and determine polices for (Continued)

the usage of the resource pool. In this way, the resource pool can be configured more efficient for V2X packet distribution and reception.

9 Claims, 4 Drawing Sheets

(56) References Cited

U.S. PATENT DOCUMENTS

| | | | | |
|---|---|---|---|---|
| 2020/0077380 | A1* | 3/2020 | Hahn | H04W 72/51 |
| 2020/0128470 | A1 | 4/2020 | Mok et al. | 40/14 |
| 2020/0245389 | A1 | 7/2020 | Mok et al. | 76/15 |
| 2020/0374738 | A1* | 11/2020 | Li | H04W 28/0933 |
| 2021/0219268 | A1* | 7/2021 | Li | H04B 17/318 |
| 2021/0243762 | A1* | 8/2021 | Selvanesan | H04L 5/006 |
| 2022/0287024 | A1* | 9/2022 | Hahn | H04W 72/51 |

FOREIGN PATENT DOCUMENTS

| | | |
|---|---|---|
| CN | 108260082 A | 7/2018 |
| WO | WO-2018/174642 A1 | 9/2018 |
| WO | WO 2019/027288 A1 | 2/2019 |
| WO | WO-2019/031837 A1 | 2/2019 |
| WO | WO-2019/067082 A1 | 4/2019 |
| WO | WO-2019/096705 A1 | 5/2019 |

OTHER PUBLICATIONS

"3rd Generation Partnership Project, Technical Specification Group Radio Access Network; Evolved Universal Terrestrial Radio Access (E-UTRA); Radio Resource Control (RRC); Protocol specification (Release 15)", 3GPP TS 36.331, V15.5.1, Apr. 2019, pp. 1-948.
"Considerations for Geographical Zone Design for NR V2X", 3GPP TSG-RAN WG2 Meeting #106, R2-1906383, Agenda Item: 11.4.4, InterDigital Inc., May 13-17, 2019, pp. 1-2.
"Discussion on NR V2X mode 2 resource allocation", 3GPP TSG-RAN WG2 Meeting #105bis, R2-1903604, Agenda Item: 11.4.3, ZTE Corporation, Apr. 8-12, 2019, pp. 1-4.
"Zone-based resource allocation for NR V2X", 3GPP TSG-RAN WG2 Meeting #105bis, R2-1903225, Agenda Item: 11.4.3, MediaTek Inc., Apr. 8-12, 2019, pp. 1-3.
"3rd Generation Partnership Project; Technical Specification Group Services and System Aspects; Architecture enhancements for V2X services (Release 16)", 3GPP TS 23.285, V16.0.0, Mar. 2019, pp. 1-37.
Office Action received for corresponding Chinese Patent Application No. 201980099261.4, dated May 12, 2024, 6 pages of Office Action and 10 pages of translation available.
Huawei et al., "Discussion on sidelink resource allocation mode 1," 3Gpp TSG RAN WG1 Meeting #96bis R1-1903950, Apr. 12, 2019.
Fujitsu "Geographic Information based Dynamic TFRP Resource Selection Procedure in NR-V2X," 3GPP TSG RAN WG1 #97 R1-1906441, May 14, 2019.
Rejection Decision received for corresponding Chinese Patent Application No. 201980099261.4, dated Jul. 31, 2024, 8 pages of Rejection Decision and 5 pages of translation available.
"R1-167805, On resource selection for V2P communication", Nokia, Alcatel-Lucent, 3GPP TSG RAN WGI Meeting #86, Aug. 2016, 3 pages.
"R2-168044, Congestion control in zone-based resource pool", Samsung, 3GPP TSG RAN WG2 #96, Nov. 2016, 2 pages.

* cited by examiner

RESOURCE POOL CONFIGURATION AND USAGE FOR V2X

CROSS REFERENCE TO RELATED APPLICATION

This patent application is a U.S. National Stage application of International Patent Application Number PCT/CN2019/100660 filed Aug. 14, 2019, which is hereby incorporated by reference in its entirety.

FIELD

Embodiments of the present disclosure generally relate to the field of telecommunication and in particular, to devices, methods, apparatuses and computer readable storage media of resource pool configuration and usage for V2X (Vehicle-to-Everything).

BACKGROUND

Vehicle-to-everything (V2X) communication is enabled in 5G New Radio (NR). V2X communication includes any combination of direct communication between vehicles, pedestrians, infrastructures, and networks, and thus can be divided into the following four different types: Vehicle-to-Vehicle (V2V), Vehicle-to-Pedestrian (V2P), Vehicle-to-Infrastructure (V2I), Vehicle-to-Network (V2N). A sidelink transmission via a physical sidelink control channel (PSCCH) and a physical sidelink share channel (PSSCH) have been studied to enable communication between terminal devices.

A network device may configure the resource pools for the terminal devices in V2X based on the serving cells or some certain areas, which may be referred to as "Zone." The terminal device may select the resources for transmission from the cell-based resource pools or the zone-based resource pools.

SUMMARY

In general, example embodiments of the present disclosure provide a solution of resource pool configuration and usage for V2X.

In a first aspect, there is provided a first device. The first device comprises at least one processor; and at least one memory including computer program codes; the at least one memory and the computer program codes are configured to, with the at least one processor, cause the first device at least to receive information of a set of resource pools allocated for a predetermined area from a second device and a usage pattern for the set of resource pools from a third device, the usage pattern at least indicating an association between the set of resource pools and at least one property of the predetermined area; determine at least one attribute of the first device related to the at least one property; and determine a target resource pool for communication from the set of resource pools based on the at least one attribute, the information and the usage pattern.

In a second aspect, there is provided a second device. The second device comprises at least one processor; and at least one memory including computer program codes; the at least one memory and the computer program codes are configured to, with the at least one processor, cause the second device at least to determine a capacity of a resource pool, the capacity indicating transmission capability of the resource pool; determine a set of resource pools allocated for a predetermined area based on the capacity; and transmit information at least indicating the set of resource pools allocated to the first device and the third device.

In a third aspect, there is provided a third device. The third device comprises at least one processor; and at least one memory including computer program codes; the at least one memory and the computer program codes are configured to, with the at least one processor, cause the third device at least to receive information of a set of resource pools allocated for a predetermined area from a second device; determine, based on the information, a usage pattern for the set of resource pools, the usage pattern at least indicating an association between the set of resource pools and at least one property of the predetermined area; and transmit the usage pattern to the first device.

In a fourth aspect, there is provided a method. The method comprises receiving, at a first device, information of a set of resource pools allocated for a predetermined area from a second device and a usage pattern for the set of resource pools from a third device, the usage pattern at least indicating an association between the set of resource pools and at least one property of the predetermined area; determining at least one attribute of the first device related to the at least one property; and determining a target resource pool for communication from the set of resource pools based on the at least one attribute, the information and the usage pattern.

In a fifth aspect, there is provided a method. The method comprises determining, at a second device, a capacity of a resource pool, the capacity indicating transmission capability of the resource pool; determining a set of resource pools allocated for a predetermined area based on the capacity; and transmitting information at least indicating the set of resource pools allocated to the first device and the third device.

In a sixth aspect, there is provided a method. The method comprises receiving information of a set of resource pools allocated for a predetermined area from a second device; determining, based on the information, a usage pattern for the set of resource pools, the usage pattern at least indicating an association between the set of resource pools and at least one property of the predetermined area; and transmitting the usage pattern to the first device.

In a seventh aspect, there is provided an apparatus comprises means for receiving, at a first device, information of a set of resource pools allocated for a predetermined area from a second device and a usage pattern for the set of resource pools from a third device, the usage pattern at least indicating an association between the set of resource pools and at least one property of the predetermined area; means for determining at least one attribute of the first device related to the at least one property; and means for determining a target resource pool for communication from the set of resource pools based on the at least one attribute, the information and the usage pattern.

In an eighth aspect, there is provided an apparatus comprises means for determining, at a second device, a capacity of a resource pool, the capacity indicating transmission capability of the resource pool; means for determining a set of resource pools allocated for a predetermined area based on the capacity; and means for transmitting information at least indicating the set of resource pools allocated to the first device and the third device.

In a ninth aspect, there is provided an apparatus comprises means for receiving information of a set of resource pools allocated for a predetermined area from a second device; means for determining, based on the information, a usage pattern for the set of resource pools, the usage pattern at least indicating an association between the set of resource pools and at least one property of the predetermined area; and means for transmitting the usage pattern to the first device.

In a tenth aspect, there is provided a computer readable medium having a computer program stored thereon which, when executed by at least one processor of a device, causes the device to carry out the method according to the fourth aspect.

In an eleventh aspect, there is provided a computer readable medium having a computer program stored thereon which, when executed by at least one processor of a device, causes the device to carry out the method according to the fifth aspect.

In an twelfth aspect, there is provided a computer readable medium having a computer program stored thereon which, when executed by at least one processor of a device, causes the device to carry out the method according to the sixth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:
 (a) hardware-only circuit implementations (such as implementations in only analog and/or digital circuitry) and
 (b) combinations of hardware circuits and software, such as (as applicable):

(i) a combination of analog and/or digital hardware circuit(s) with
software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 1:
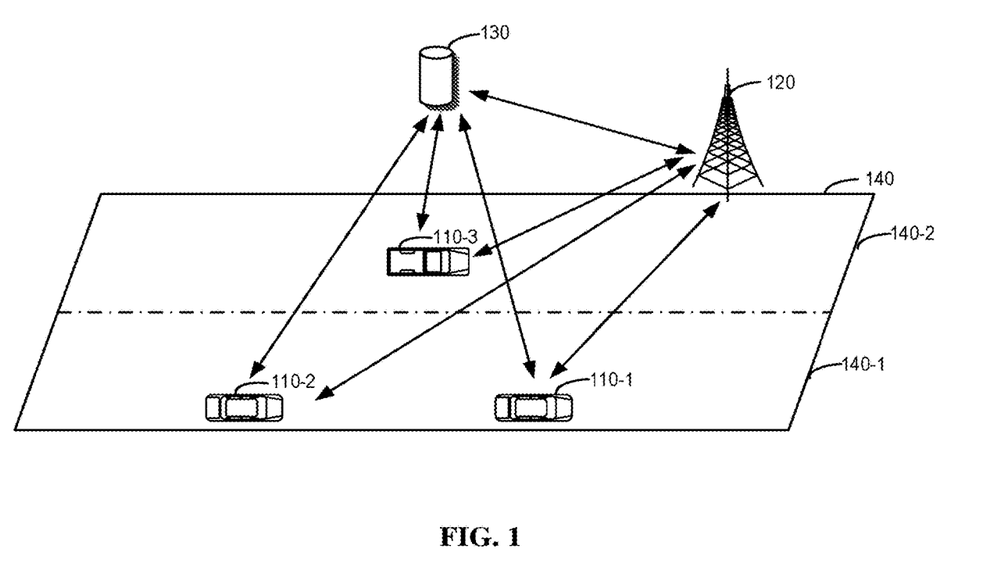
FIG. 1 shows an example communication network in which example embodiments of the present disclosure may be implemented.

FIG. 1 shows an example communication network 100 in which embodiments of the present disclosure can be implemented. The network 100 includes first devices 110-1-110-3 (hereinafter may be collectively referred to as first devices 110 or individually referred to as terminal devices 110), second device 120 (hereinafter may be referred to as network device 120) and a third device 130 (hereinafter may be referred to as V2X control device 130.) The network device 120 may be owned by a cellular operator. The V2X control device 130 may be implemented as part of the V2X Control Function or V2X Application Server. The V2X control device 130 may be owned by the same cellular operator as network device 120, or may be a separate service provider. The network device 120 and the V2X control device 130 may communicate with the first devices 110-1 to 110-3, respectively. It is to be understood that the number of terminal devices and network device is only for the purpose of illustration without suggesting any limitations. The network 100 may include any suitable number of terminal devices and network devices adapted for implementing embodiments of the present disclosure.

The network 100 illustrates a scenario of V2X communication. As mentioned above, V2X communication can be divided into four types, including Vehicle-to-Vehicle (V2V), Vehicle-to-Pedestrian (V2P), Vehicle-to-Infrastructure (V2I), Vehicle-to-Network (V2N). Communication between terminal devices 110 (that is, V2V, V2P, V2I communications) can be performed via both Uu interface and direct links (or sidelinks). For sidelink-based V2X communication, information may be transmitted from a Transmit (TX) terminal device to one or more Receive (RX) terminal devices in a broadcast, or groupcast, or unicast manner.

As described above, a sidelink transmission via a physical sidelink control channel (PSCCH) and a physical sidelink share channel (PSSCH) have been studied to enable communication between terminal devices for V2X communications. A physical sidelink feedback channel (PSFCH) is defined to convey sidelink feedback control information (SFCI). A resource pool is a set of time-frequency resources that can be used for sidelink (SL) transmission and/or reception. From the terminal device point of view, a resource pool is inside the terminal device's bandwidth, within a SL Bandwidth Part (BWP) and has a single numerology. Time domain resources in a resource pool can be non-contiguous.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In the network device 100, the terminal devices 110-1-110-3 may be referred to as V2X terminal devices. Specifically, the terminal devices 110-1-110-3 may be vehicles moving on the road. The network device may configure resource pools for a certain area 140, to support the V2X communication of the terminal devices 110-1-110-3.

The terminal devices 110-1-110-3 may have various types of the vehicle and travel on different lane or road. For example, the terminal devices 110-1 and 110-2 may be sedan cars and may travel on the express lane 140-1. Further, the terminal device 110-3 may be a truck and may travel on the truck lane 140-2.

Currently, the resource pool configuration of the network device 120 may be cell-based or zone-based. The cell-based resource pool configuration means that the network device 120 may configure the resource pool per a serving cell of the network device 120.

As another option, if zone-based resource pool configuration is enabled, the network device may divide different zones according to the relative location with the terminal devices (or according to the absolute location of the terminal devices). As used herein, the term "zone" may refer to as a geographical zone. The terminal device may determine the identity (ID) of the zone where the terminal device is located by means of the location functionality, for example, a GPS functionality, integrated in the terminal device.

The determining the zone ID, Equations (1)-(3) are represented as below:

$$x'=\text{Floor}(x/L)\text{Mod } Nx \quad (1)$$

$$y'=\text{Floor}(y/W)\text{Mod } Ny \quad (2)$$

$$\text{Zone\_id}=y'*Nx+x' \quad (3)$$

where L is the value of zoneLength included in zoneConfig in SystemInformationBlockType21 or in SL-V2X-Preconfiguration; W is the value of zoneWidth included in zoneConfig in SystemInformationBlockType21 or in SL-V2X-Preconfiguration; Nx is the value of zoneIdLongi- Mod included in zoneConfig in SystemInformationBlockType21 or in SL-V2X-Preconfiguration; Ny is the value of zoneIdLatiMod included in zoneConfig in SystemInformationBlockType21 or in SL-V2X-Preconfiguration; x is the geodesic distance in longitude between the terminal device's current location and geographical coordinates (0, 0) according to WGS84 model [80] and it is expressed in meters; y is the geodesic distance in latitude between the terminal device's current location and geographical coordinates (0, 0) according to WGS84 model [80] and it is expressed in meters.

In LTE and as per current NR discussion, V2X resource pool is configured by the network device. Even it is possible for the cellular operator to reconfigure the V2X resource pool, the configuration of the V2X resource pool may be considered semi-static. However, the amount of traffic is not uniform over a certain geographical area. As a result the amount of resources configured for V2X may be over-provisioned or under-provisioned leading to inefficiencies and/or higher collision rates. The density of vehicles in the certain geographical area during rush hour traffic may be significantly larger than during the rest of the day. For example, there may be no V2X terminal device within certain zone and still a resource pool is configured for this zone, which may lead to the resource underutilization. That is, the conventional way for configuring the resource pool may not adjust the amount of the resources allocated for the certain area dynamically, because the resource are preconfigured, which may cause the waste of the resources or the lack of the resources.

Furthermore, even though the V2X packets are sent via direct communication (e.g. sidelink), it may generate high volume traffic to a receiving V2X terminal device. With current V2X, a V2X terminal device may have to monitor multiple V2X resource pools, and receive many V2X packets. The receiving V2X terminal device can only discard the V2X packets after processing the received V2X packets in the application layer, i.e. only be able to discard the received V2X packet if the receiving V2X terminal device is out of the target area as indicated by the received V2X packet. This can cause overload in the receiver, and this is also not energy efficient.

Ideally, the receiving V2X terminal device shall not try to receive those unrelated V2X packets (or not monitor the V2X resource pool used by the unrelated V2X terminal devices). For example, usually the vehicle heading north on the highway may not need to interact with the vehicles heading to south and the vehicles on an express lane may not need to interact with the vehicles on truck lane.

An approach is proposed to allocate the resource pool based on the speed-based Zone. However, it may be difficult for the cellular operator to know the speed for each highway or lane and the exact highway/road information.

Therefore, the present disclosure proposes a solution for configuring the resource pool for V2X efficiently. In this solution, the configuration and usage of the resource pool may adapt to traffic conditions and the V2X terminal device may only monitor the relevant V2X resource pool.

Figure 2:
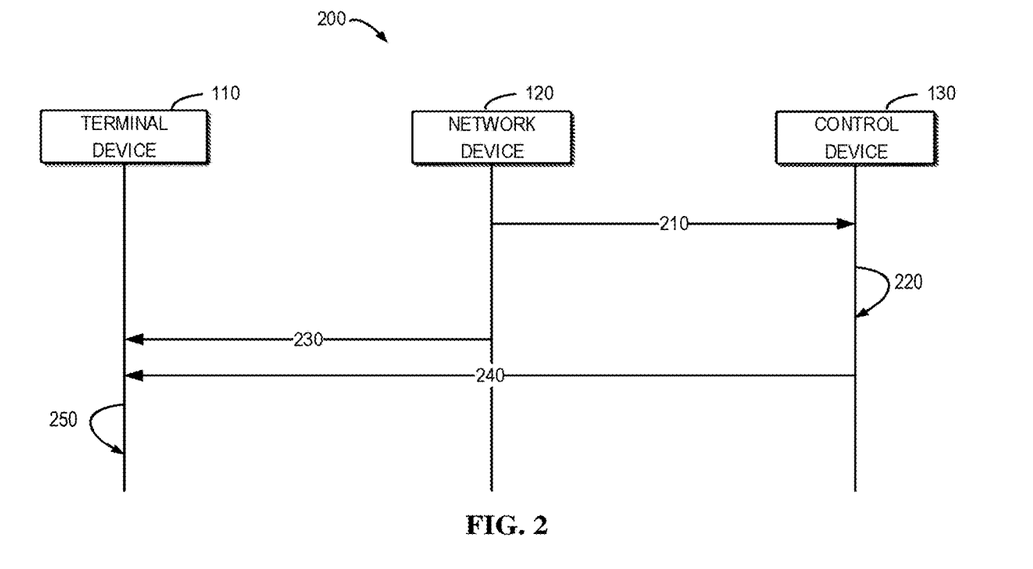
FIG. 2 shows a schematic diagram illustrating a process 200 of resource pool configuration and usage for V2X according to example embodiments of the present disclosure.

Principle and implementations of the present disclosure will be described in detail below with reference to FIG. 2, which shows a schematic diagram of resource pool configuration and usage for V2X. For the purpose of discussion, the process 200 will be described with reference to FIG. 1. The process 200 may involve the terminal device 110, the network device 120 and the V2X control device 130 as illustrated in FIG. 1.

For a specific area 140, a set of resource pools may be allocated by the network device 120. In some example embodiments, the network device 120 may determine the capacity of a resource pool. The capacity of the resource pool may be, for example, defined as N V2X messages could be supported in a transmission having the average size of Y bytes using a specific Modulation and Coding Scheme (MCS) per a specific period (e.g. per second), where N and Y can be any integer number. Each resource pool in the set of resource pools may have a same or different capacity. The network device 120 may also determine the radio resource configuration of a resource pool. The configuration for the resource pool may be the same in a very large area. This may facilitate an IDLE/INACTIVE terminal device use the same configuration (e.g. same pool index) for a large area.

The network device 120 transmits 210 the information of the configured set of resource pools to the V2X control device 130. The information may comprise the determined capacity of each resource pool in the set of resource pools. The information may also comprise the number of resource pools in the set and the indices of the resource pools in the set. Further, the information may also comprise an indication that the use of the set of resource pools is controlled by the usage pattern determined by the third device.

The V2X control device 130 may receive the information and determine 220 the usage pattern, e.g. policy for using this resource pools based on the received information of the set of resource pools. Alternatively, the V2X control device 130 may fine tune the set of resource pools allocated for the specific area, namely the number of the resource pools in the set and the indices of the resource pools in the set. That is, the set of resource pools may be determined by the network device 120 coordinating with the V2X control device 130.

Figure 3:
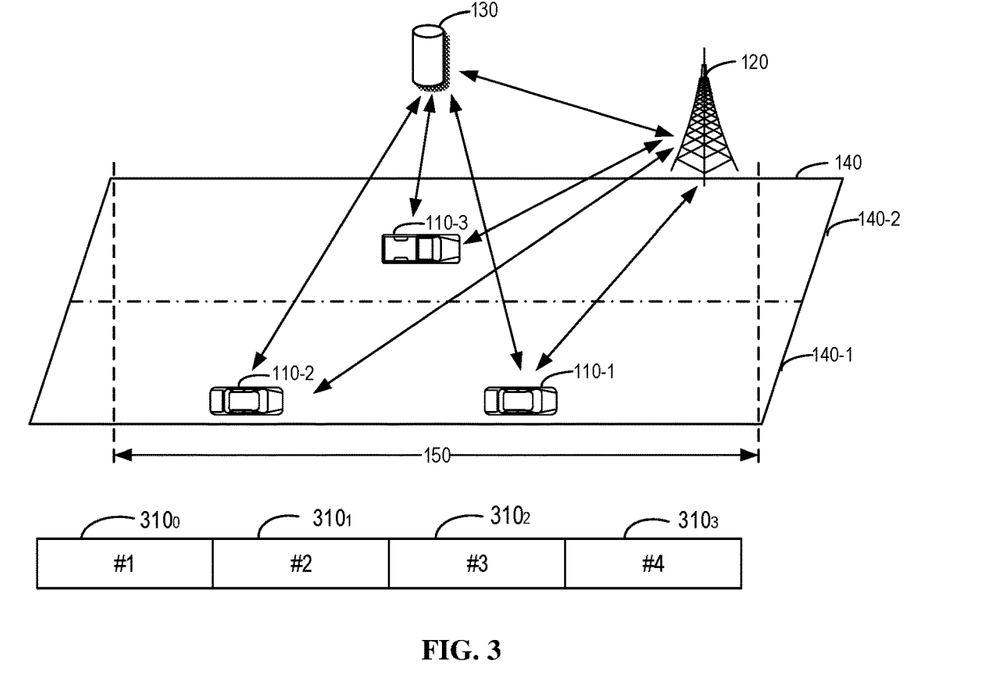
FIG. 3 shows diagrams of an example usage of the allocated resource pool according to some example embodiments of the present disclosure.

After the corresponding configuration of the set of resource pools is determined, the V2X control device 130 determines the usage pattern. The usage pattern may at least indicate which resource pool(s) in the set may be allocated for a certain road in the specific area having at least one property. With reference to FIG. 3, the examples of the usage pattern may be further described in details.

FIG. 3 shows diagrams of an example usage of the allocated resource pool according to some example embodiments of the present disclosure. As shown in FIG. 3, the specific area may be represented as the area 140, and each lane 140-1 or 140-2 in the area 140 may represent as a sub-area in the area 140, respectively. As mentioned above, the lane 140-1 may be an express lane and the lane 140-2 may be a truck lane. FIG. 3 also shows an example of a set of resource pools $310_0$-$310_3$ and its indices #1-#4, which may be obtained from the configuration information transmitted from the network device 120 or coordinated by the network device 120 and the V2X control device 130.

For example, the property may be a range of a certain road in the specific area, the type of the road, the lane of the road, the direction of the road and the time interval within which the usage pattern is valid or invalid for the specific area of the road.

The usage pattern may indicate at least a valid time period of the usage pattern, an invalid time period of the usage pattern, the number and the indices of the resource pools allocated for the associated with at least one of the properties of the specific area. The usage pattern may further include an indication of ignoring a zone-based resource pool allocated by the second device.

For example, for the lane 140-1, a usage pattern may be represented as "6:00-10:00 am East, road section 150, resource pools #1 and #2 for lane 140-1 (express lane)" or "6:00-10:00 am East, road section 150, resource pool #3 for lane 140-2 (truck lane)," etc. In another example, a usage pattern may indicate different resource pools for transmitting and reception. For example, for a car trying to leave express lane, the usage patter may indicate transmitting using resource pool #3 (i.e. the resource pool allocated for truck lane), and monitoring resource pool #1 and #2 (i.e. the resource pool allocated for express lane), and #3 (i.e. the resource pool allocated for truck lane).

In some example embodiments, the usage pattern may be determined by the V2X control device based on the traffic state of the certain road in the specific area. For example, during the rush hours or a busy road, more resource pools may be allocated. In one example, for the lane 140-1, a usage pattern may be represented as "East, road section 150, resource pools #1, #2, and #4 for lane 140-1 (express lane)". The V2X control device may consider the traffic state and the capacity of a resource pool and determine a suitable usage pattern of the resource pools for the certain road.

In some example embodiments, the traffic state may be monitored by the V2X control device 130, for example, based on the traffic report received from the V2X terminal devices, etc. The V2X control device 130 may monitor the changes in the area or the certain road (for example, in different lane or road), and determine or adjust the usage pattern, i.e. adjust the number of resource pool allocated for a target area.

Referring back to FIG. 2, the second device 120 transmits 230 the information of the set of resource pools allocation including at least one of the number and indices of the resource pools, the radio resource configuration for each resource pool to the first device 110. The third device 130 transmits 240 the determined usage pattern to the first device 110. It is noted that the sequence for receiving the information and the usage pattern may be in parallel or in sequence. The first device 110 may also receive the usage pattern before receiving the information. Alternatively, the actions 230 and 240 may occur at the same time. That is, the terminal device 110 may receive the usage pattern and the information of the set of resource pool simultaneously.

The terminal device determines the at least one attribute of the terminal device related to the above-mentioned at least one property. The attribute may be referred to parameters of the road on which the terminal device is travelling. For example, the attribute comprise a type of a road on which the first device is travelling, the location of the first device on the road, a driving direction of the first device. Further, the attribute comprise may also comprise a current time at which the first device is travelling on the road.

In some example embodiments, the terminal device 110 may determine the attribute based on the GPS function of the terminal device 110. The parameters of the road may comprise the road identifier, for example road 150 shown in FIG. 3, the type of the lane or road, for example express lane 140-1 shown in FIG. 3, the travel direction of the terminal device, for example, East direction, etc.

The terminal device 110 then determines 250 the target resource pool for possible V2X communication based on, the determined attributes, the information and the usage pattern.

In some example embodiments, the terminal device 110 may determine the target number and the target indices of the resource pools for the road on which the terminal device is travelling based on the determined attributes, the usage pattern and the information of a set of resource pools allocated for a predetermined area.

For example, if the terminal device 110-1, shown in FIG. 3, and determine the usage pattern indicates "East, road section 150, resource pools #1 and #2 for lane 140-1 (express lane)", the terminal device 110-1 may determine that this usage pattern may indicate the resource pool for the terminal device 110-1. That is, the terminal device 110-1 may monitor the resource pools #1 and #2 and select a target resource for V2X communication, for example, receiving or transmitting a V2X packet. In another example, the terminal device 110-1 may monitor the resource pools #1, #2 and #3, and use resource pool #3 for transmitting a V2X packet Further, as mentioned above, the third device 130 may adjust the usage pattern based on the monitoring of the traffic state or other environment conditions, for example, the weather. If the current usage pattern is changed, the third device 130 may transmit the adjusted usage pattern to the terminal device 110 to inform the terminal device to update the resource pool usage.

Furthermore, the usage pattern or usage policy may also comprise the zone-based resource allocation configured by the network device may not be used and a modified sub-area-based resource allocation given by the application layer instead may be used. Also, to fine-tune the zone-based resource allocation, e.g. the network device configures resource pool #1, #2, #3 and #4 for a zone, and V2X control device may further configure resource pool #1 is reserved for terminal devices on express lane. Moreover, to use a specific resource pool out of a set of resource pools which are subsets of the pool(s) provided by the network device with or without zone-based resource allocation and the terminal device may be configured with policies to determine a specific resource pool by itself, similar to the zone-based resource allocation.

In the solution, the V2X control device may coordinate the resource pool configuration with the network device and determine polices for the usage of the resource pool dynamically. In this way, the resource pool can be configured more efficiently for V2X packet distribution and reception (or monitoring).

Figure 4:
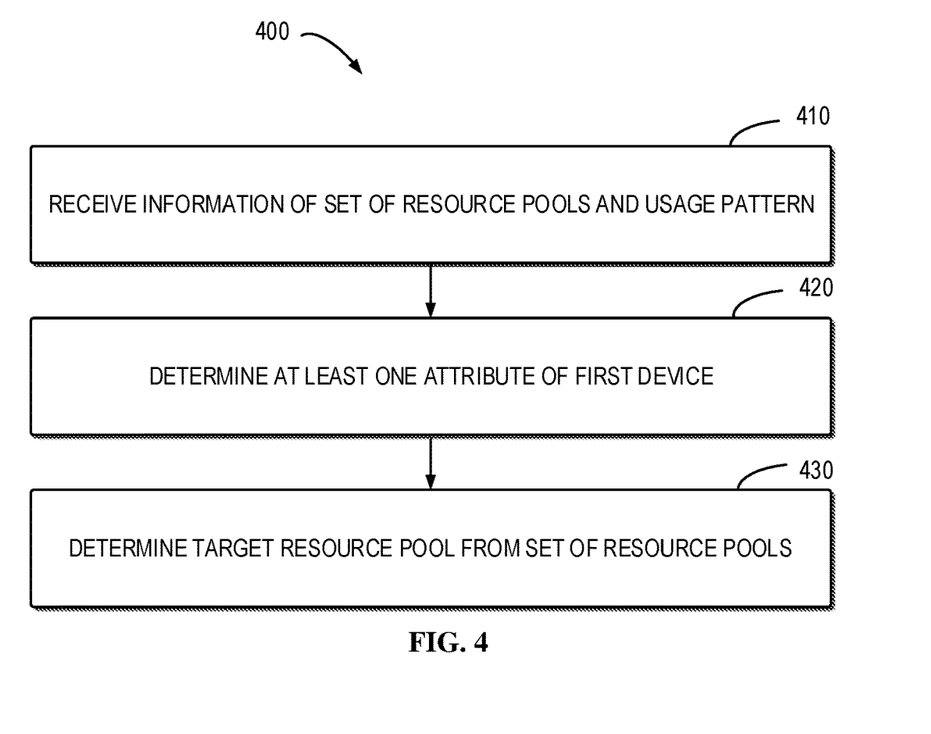
FIG. 4 shows a flowchart of an example method 400 of diagrams of resource pool configuration and usage for V2X according to some example embodiments of the present disclosure.

FIG. 4 shows a flowchart of an example method 400 of resource pool configuration and usage for V2X. According to some example embodiments of the present disclosure. The method 400 can be implemented at the first device 110 as shown in FIG. 1. For the purpose of discussion, the method 400 will be described with reference to FIG. 1.

As shown in FIG. 4, at 410, the first device 110 receives information of a set of resource pools allocated for a predetermined area from a second device, and a usage pattern for the set of resource pools from a third device, the usage pattern at least indicating an association between the set of resource pools and at least one property of the predetermined area.

In some example embodiments, the information of the set of resource pools includes at least one of the following: a capacity of a resource pool in the set of resource pools, the capacity indicating transmission capability of the at least one resource pool in a predetermined time period; an indication that the use of the set of resource pools is controlled by the usage pattern; indices of the set of resource pools, the number of the set of resource pools, and the radio resource configuration of each resource pool.

In some example embodiments, the usage pattern further includes at least one of the following: a valid time period of the usage pattern, an invalid time period of the usage pattern, the number of resource pools in the set of the resource pools associated with at least one of the properties of the predetermined area, indices of resource pools in the set of the resource pools associated with at least of one of the properties of the predetermined area, and an indication of ignoring a zone-based resource pool allocated by the second device.

In some example embodiments, the at least one property includes at least one of the following: a range of a road in the predetermined area, a type of the road, a lane of the road, a direction of the road, and a time interval within which the usage pattern is valid or invalid for the road.

At 420, the first device 110 determines at least one attribute of the first device related to the at least one property.

In some example embodiments, the first device 110 may determine a type of a road on which the first device is travelling, a location of the first device on the road, a driving direction of the first device, and a current time at which the first device is travelling on the road.

At 430, the first device 110 determines a target resource pool for communication from the set of resource pools based on the at least one attribute, the information and the usage pattern.

In some example embodiments, the first device 110 may determine, based on the at least one attribute, the usage pattern and the information, the target number and the target indices of the resource pools allocated for a road on which the first device is travelling.

In some example embodiments, the first device 110 may further receive an adjusted usage pattern from the third device; and update the target resource pool based on the adjusted usage pattern.

Figure 5:
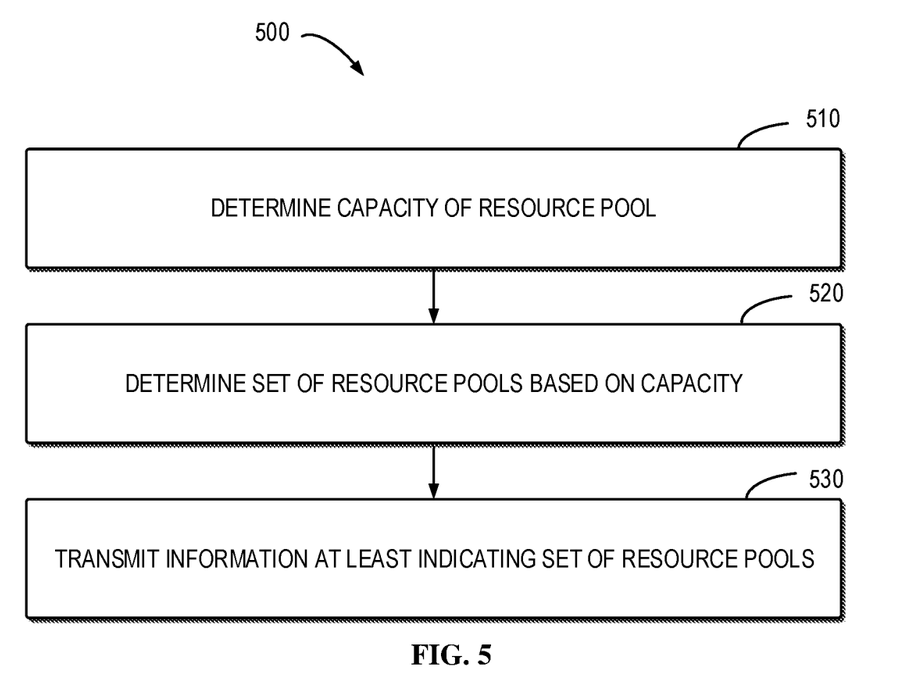
FIG. 5 shows a flowchart of an example method 500 of diagrams of resource pool configuration and usage for V2X according to some example embodiments of the present disclosure.

FIG. 5 shows a flowchart of an example method 500 of resource pool configuration and usage for V2X according to some example embodiments of the present disclosure. The method 500 can be implemented at the second device 120 as shown in FIG. 1. For the purpose of discussion, the method 500 will be described with reference to FIG. 1.

As shown in FIG. 5, at 510, the second device 120 determines a capacity of a resource pool, the capacity indicating transmission capability of the resource pool. At 520, the second device 120 determines a set of resource pools allocated for a predetermined area based on the capacity. At 530, the second device 120 transmits information at least indicating the set of resource pools allocated to the first device and the third device.

In some example embodiments, the second device 120 transmit to the first device at least one of the following: a capacity of a resource pool in the set of resource pools, the capacity indicating transmission capability of the at least one resource pool in a predetermined time period; an indication that the use of resource pool is controlled by the usage pattern; indices of the set of resource pools, and the number of the set of resource pools, and the radio resource configuration of each resource pool.

In some example embodiments, the second device 120 transmit to the third device the following: a capacity of a resource pool in the set of resource pools, the capacity indicating transmission capability of the at least one resource pool in a predetermined time period; indices of the set of resource pools, and the number of the set of resource pools.

Figure 6:
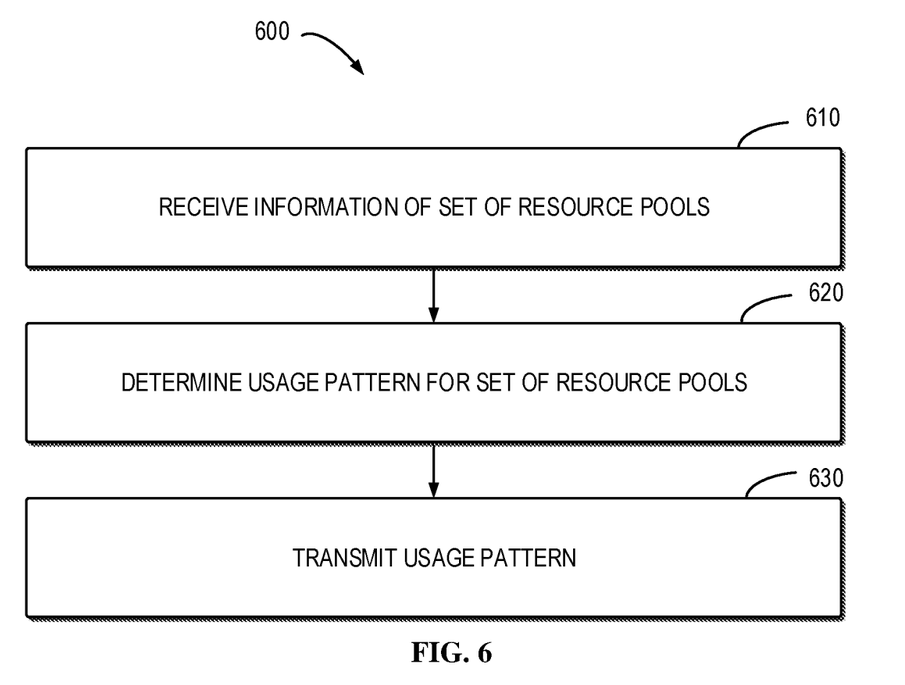
FIG. 6 shows a flowchart of an example method 600 of diagrams of resource pool configuration and usage for V2X according to some example embodiments of the present disclosure.

FIG. 6 shows a flowchart of an example method 600 of resource pool configuration and usage for V2X according to some example embodiments of the present disclosure. The method 600 can be implemented at the third device 130 as shown in FIG. 1. For the purpose of discussion, the method 600 will be described with reference to FIG. 1.

As shown in FIG. 6, at 610, the third device 130 receives information of a set of resource pools allocated for a predetermined area from a second device.

At 620, the third device 130 determines, based on the information, a usage pattern for the set of resource pools, the usage pattern at least indicating an association between the set of resource pools and at least one property of the predetermined area.

In some example embodiments, the third device 130 may determine a traffic state of the road in the predetermined area. The third device 130 may obtain a capacity of a resource pool in the set of resource pools, the capacity indicating transmission capability of the at least one resource pool in a predetermine time period, indices of the set of resource pools from the information and determine the number and indices of resource pools in the set of the resource pools allocated for the road at least based on the traffic state, the capacity and the indices.

In some example embodiments, the usage pattern further includes at least one of the following: a valid time period of the usage pattern, an invalid time period of the usage pattern, the number of resource pools in the set of the resource pools associated with at least one of the properties of the predetermined area, indices of resource pools in the set of the resource pools associated with at least of one of the properties of the predetermined area, and an indication of ignoring a zone-based resource pool allocated by the second device.

In some example embodiments, the third device 130 may determine the at least one property including at least one of the following: a range of a road in the predetermined area, a type of the road, a lane of the road, a direction of the road, and a time interval within which the usage pattern is valid or invalid for the road. The third device 130 may determine the traffic state related to the at least one property.

At 630, the third device 130 transmits the usage pattern to the first device.

In some example embodiments, the third device 130 may further adjust the usage pattern based on the changed traffic state if detecting that the traffic state is changed, adjust the usage pattern based on the changed traffic state. The third device 130 may transmit the adjusted usage pattern to the first device.

In some example embodiments, an apparatus capable of performing the method 400 (for example, implemented at the terminal device 110) may comprise means for performing the respective steps of the method 400. The means may be implemented in any suitable form. For example, the means may be implemented in a circuitry or software module.

In some example embodiments, the apparatus comprises means for receiving, at a first device, information of a set of resource pools allocated for a predetermined area from a second device and a usage pattern for the set of resource pools from a third device, the usage pattern at least indicating an association between the set of resource pools and at least one property of the predetermined area; means for determining at least one attribute of the first device related to the at least one property; and means for determining a target resource pool for communication from the set of resource pools based on the at least one attribute, the information and the usage pattern.

In some example embodiments, an apparatus capable of performing the method 500 (for example, implemented at the network device 120) may comprise means for performing the respective steps of the method 500. The means may be implemented in any suitable form. For example, the means may be implemented in a circuitry or software module.

In some example embodiments, the apparatus comprises means for determining, at a second device, a capacity of a resource pool, the capacity indicating transmission capability of the resource pool; means for determining a set of resource pools allocated for a predetermined area based on the capacity; and means for transmitting information at least indicating the set of resource pools allocated to the first device and the third device.

In some example embodiments, an apparatus capable of performing the method 600 (for example, implemented at the V2X control device 130) may comprise means for performing the respective steps of the method 600. The means may be implemented in any suitable form. For example, the means may be implemented in a circuitry or software module.

In some example embodiments, the apparatus comprises means for receiving information of a set of resource pools allocated for a predetermined area from a second device; means for determining, based on the information, a usage pattern for the set of resource pools, the usage pattern at least indicating an association between the set of resource pools and at least one property of the predetermined area; and means for transmitting the usage pattern to the first device.

Figure 7:
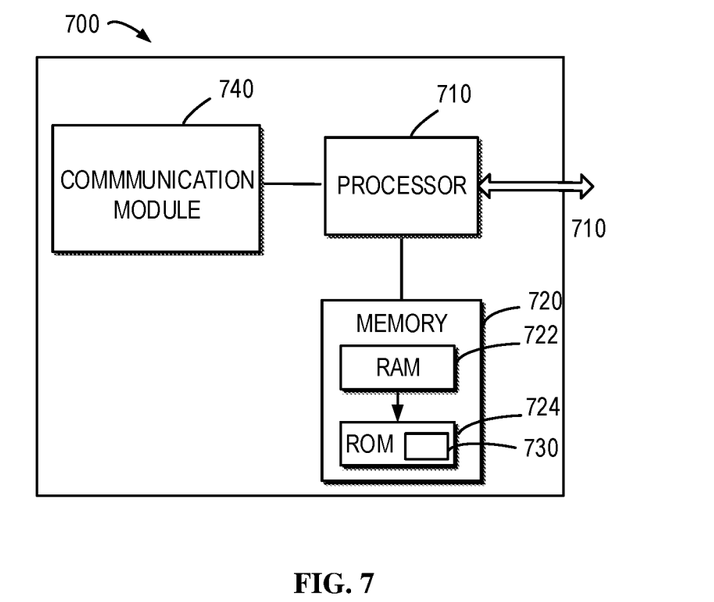
FIG. 7 shows a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the first device 110 and the second device 120 and the third device 130 as shown in FIG. 1. As shown, the device 700 includes one or more processors 710, one or more memories 720 coupled to the processor 710, and one or more transmitters and/or receivers (TX/RX) 740 coupled to the processor 710.

The TX/RX 740 is for bidirectional communications. The TX/RX 740 may have at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 2 to 6. The embodiments of the present disclosure may also be implemented by hardware or by a combination of software and hardware.

Figure 8:
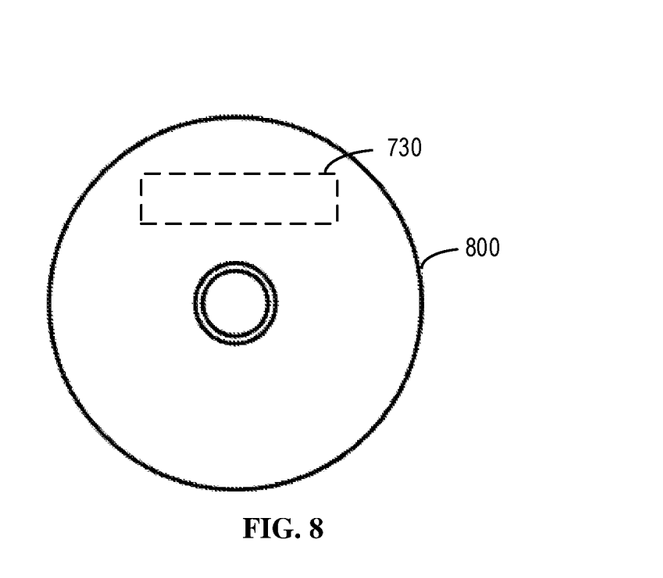
FIG. 8 shows a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400, 500 and 600 as described above with reference to FIGS. 2-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one non-transitory memory including computer program codes that, when executed by the at least one processor, cause the first device at least to perform the following operations:
   receive information of a set of resource pools allocated for a predetermined area from a second device and a usage pattern for the set of resource pools from a third device, the usage pattern indicating an association between the set of resource pools and a property of the predetermined area, wherein:
   the information of the set of resource pools comprises: indices of the set of resource pools, a number of resource pools in the set of resource pools, and a capacity of a resource pool in the set of resource pools, wherein the capacity indicates transmission capability of the resource pool in a predetermined time period and that a use of the set of resource pools is controlled with the usage pattern, wherein the capacity of the resource pool is defined as a number of vehicle-to-everything (V2X) messages that can be supported in a transmission having an average size of a number of bytes using a specific Modulation and Coding Scheme (MCS) per a specific period;
   the V2X messages comprise: vehicle-to-vehicle (V2V), vehicle-to-pedestrian (V2P), vehicle-to-infrastructure (V2I), and vehicle-to-network (V2N) communications;
   the property is: a range of a road in the predetermined area, a type of the road, a specific lane of the road, a direction of the road, and a time interval within which the usage pattern is valid or invalid for a specific area of the road; and
   the usage pattern includes the following: an indication of an invalid time period of the usage pattern, an indication to ignore a zone-based resource pool allocated by the second device, an indication of a valid time period of the usage pattern, an indication of the number of resource pools in the set of the resource pools associated with the properties of the predetermined area, and an indication of indices of resource pools in the set of the resource pools associated with the properties of the predetermined area;
   determine attributes of the first device related to the property, the attributes comprising: a location of the first device on the road, a driving direction of the first device on the road, a current time at which the first device is traveling on the road, and parameters of the road on which the first device is traveling, wherein the parameters comprise: a road identifier, the type of the road, the direction of the road, and a type of lane on the road the first device is traveling, the type of lane being one of an express lane or a truck lane;
   determine a target resource pool from the set of resource pools for V2X communications to the first device based on the attributes, the information, and the usage pattern;
   receive, from the third device, an adjustment to the usage pattern;
   based on receiving the adjusted usage pattern:
   determine updated attributes of the first device related to the property, the updated attributes comprising: an update to the location of the first device on the road, an update to the driving direction of the first device on the road, an update to the current time at which the first device is traveling on the road, and an update to the parameters of the road on which the first device is traveling; and
   determine an updated target resource pool from the set of resource pools for V2X communications to the first device based on the updated attributes, the information, and the adjusted usage pattern.

2. The first device of claim 1, wherein the computer program codes, when executed by the at least one processor, further cause the first device to determine target resource pool with:
   determining, based on the attributes, the usage pattern, and the information, a target number and target indices of the resource pools allocated for the road on which the first device is travelling.

3. The first device of claim 2, wherein the first device is a terminal device in V2X communication, the second device is a network device in V2X communication, and the third device is a V2X control device.

4. A system comprising:
a first device;
at least one processor; and
at least one non-transitory memory including computer program codes that, when executed by the at least one processor, cause the first device at least to perform the following operations:
receive information of a set of resource pools allocated for a predetermined area from a second device and a usage pattern for the set of resource pools from a third device, the usage pattern indicating an association between the set of resource pools and a property of the predetermined area, wherein:
the information of the set of resource pools comprises: indices of the set of resource pools, a number of resource pools in the set of resource pools, and a capacity of a resource pool in the set of resource pools, wherein the capacity indicates transmission capability of the resource pool in a predetermined time period and that a use of the set of resource pools is controlled with the usage pattern, wherein the capacity of the resource pool is defined as a number of vehicle-to-everything (V2X) messages that can be supported in a transmission having an average size of a number of bytes using a specific Modulation and Coding Scheme (MCS) per a specific period;
the V2X messages comprise: vehicle-to-vehicle (V2V), vehicle-to-pedestrian (V2P), vehicle-to-infrastructure (V2I), and vehicle-to-network (V2N) communications;
the property is: a range of a road in the predetermined area, a type of the road, a specific lane of the road, a direction of the road, and a time interval within which the usage pattern is valid or invalid for a specific area of the road; and
the usage pattern includes the following: an indication of an invalid time period of the usage pattern, an indication to ignore a zone-based resource pool allocated by the second device, an indication of a valid time period of the usage pattern, an indication of the number of resource pools in the set of the resource pools associated with the properties of the predetermined area, and an indication of indices of resource pools in the set of the resource pools associated with the properties of the predetermined area;
determine attributes of the first device related to the property, the attributes comprising: a location of the first device on the road, a driving direction of the first device on the road, a current time at which the first device is traveling on the road, and parameters of the road on which the first device is traveling, wherein the parameters comprise: a road identifier, the type of the road, the direction of the road, and a type of lane on the road the first device is traveling, the type of lane being one of an express lane or a truck lane;
determine a target resource pool from the set of resource pools for V2X communications to the first device based on the attributes, the information, and the usage pattern;
receive, from the third device, an adjustment to the usage pattern;
based on receiving the adjusted usage pattern:
determine updated attributes of the first device related to the property, the updated attributes comprising: an update to the location of the first device on the road, an update to the driving direction of the first device on the road, an update to the current time at which the first device is traveling on the road, and an update to the parameters of the road on which the first device is traveling; and
determine an updated target resource pool from the set of resource pools for V2X communications to the first device based on the updated attributes, the information, and the adjusted usage pattern.

5. The system of claim 4, wherein the computer program codes, when executed by the at least one processor, further cause the first device to determine target resource pool with:
based on the attributes, the usage pattern, and the information, determining a target number and target indices of the resource pools allocated for the road on which the first device is travelling.

6. The system of claim 5, wherein the first device is a terminal device in V2X communication, the second device is a network device in V2X communication, and the third device is a V2X control device.

7. A method comprising:
receiving, by a first device, information of a set of resource pools allocated for a predetermined area from a second device and a usage pattern for the set of resource pools from a third device, the usage pattern indicating an association between the set of resource pools and a property of the predetermined area, wherein:
the information of the set of resource pools comprises: indices of the set of resource pools, a number of resource pools in the set of resource pools, and a capacity of a resource pool in the set of resource pools, wherein the capacity indicates transmission capability of the resource pool in a predetermined time period and that a use of the set of resource pools is controlled with the usage pattern, wherein the capacity of the resource pool is defined as a number of vehicle-to-everything (V2X) messages that can be supported in a transmission having an average size of a number of bytes using a specific Modulation and Coding Scheme (MCS) per a specific period;
the V2X messages comprise: vehicle-to-vehicle (V2V), vehicle-to-pedestrian (V2P), vehicle-to-infrastructure (V2I), and vehicle-to-network (V2N) communications;
the property is: a range of a road in the predetermined area, a type of the road, a specific lane of the road, a direction of the road, and a time interval within which the usage pattern is valid or invalid for a specific area of the road; and
the usage pattern includes the following: an indication of an invalid time period of the usage pattern, an indication to ignore a zone-based resource pool allocated by the second device, an indication of a valid time period of the usage pattern, an indication of the number of resource pools in the set of the resource pools associated with the properties of the predetermined area, and an indication of indices of resource pools in the set of the resource pools associated with the properties of the predetermined area;
determining, by the first device, attributes of the first device related to the property, the attributes comprising: a location of the first device on the road, a driving direction of the first device on the road, a current time at which the first device is traveling on the road, and parameters of the road on which the first device is traveling, wherein the parameters comprise: a road identifier, the type of the road, the direction of the road, and a type of lane on the road the first device is traveling, the type of lane being one of an express lane or a truck lane;

determining, by the first device, a target resource pool from the set of resource pools for V2X communications to the first device based on the attributes, the information, and the usage pattern;

receiving, by the first device from the third device, an adjustment to the usage pattern;

based on receiving the adjusted usage pattern:
- determining, by the first device, updated attributes of the first device related to the property, the updated attributes comprising: an update to the location of the first device on the road, an update to the driving direction of the first device on the road, an update to the current time at which the first device is traveling on the road, and an update to the parameters of the road on which the first device is traveling; and
- determining, by the first device, an updated target resource pool from the set of resource pools for V2X communications to the first device based on the updated attributes, the information, and the adjusted usage pattern.

8. The method of claim 7, further comprising:
based on the attributes, the usage pattern, and the information, determining a target number and target indices of the resource pools allocated for the road on which the first device is travelling.

9. The method of claim 8, wherein the first device is a terminal device in V2X communication, the second device is a network device in V2X communication, and the third device is a V2X control device.

* * * * *